Jan. 14, 1930.  O. CHAMPLAIN, JR  1,743,190
PICTURE FRAME
Filed Feb. 11, 1928
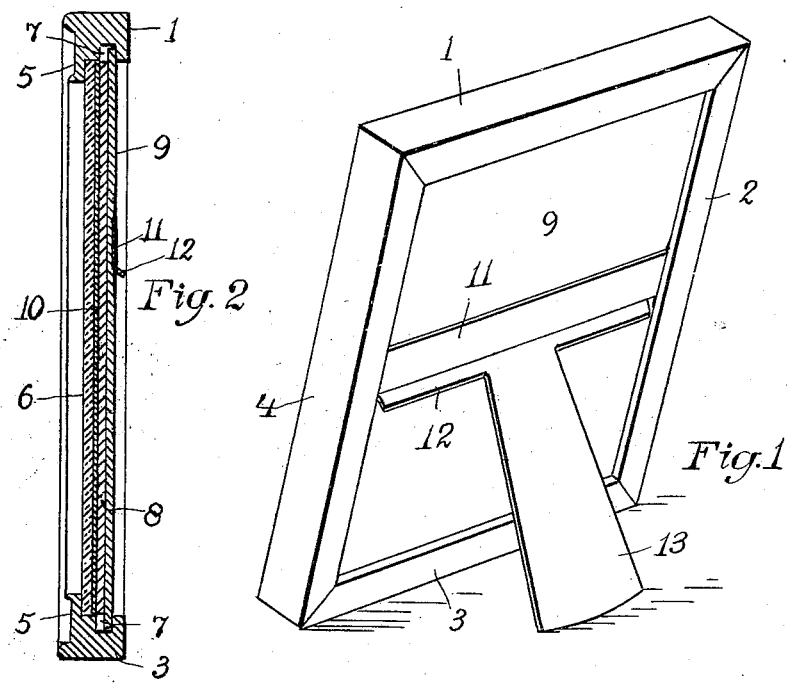
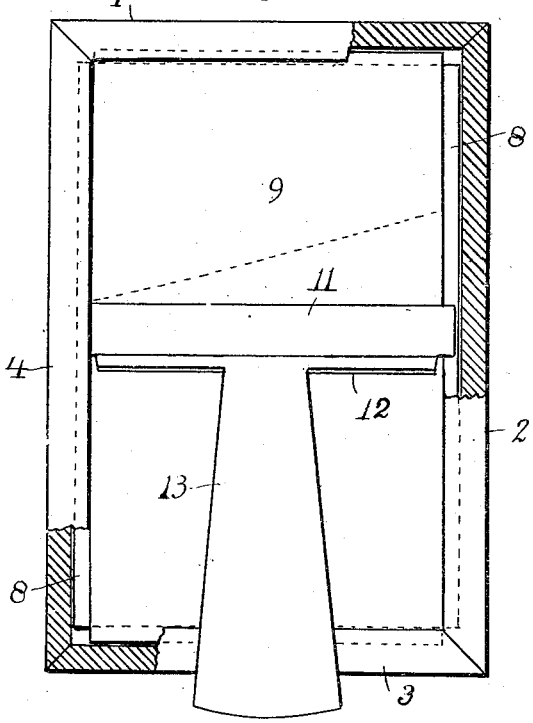
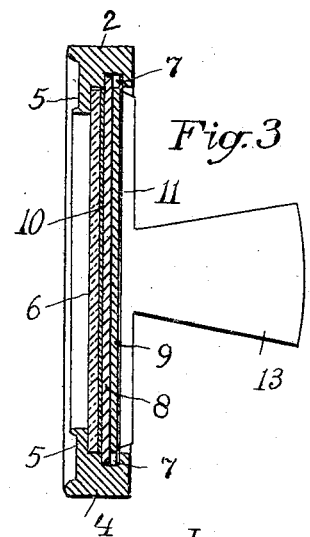
Inventor,
Orrin Champlain, Jr.
By A. B. Upham,
Attorney.

Patented Jan. 14, 1930

1,743,190

UNITED STATES PATENT OFFICE

ORRIN CHAMPLAIN, JR., OF NEWTON, MASSACHUSETTS

PICTURE FRAME

Application filed February 11, 1928. Serial No. 253,703.

In the production for picture frames designed for photographs and other small pictures, it is customary to groove the upper three members of the frame and to provide the lowermost member with a slot up through which to slide the picture, glass and backing up into the grooves.

Another method, common also with all large picture frames, is to recess the rear of the frame members, and to hold the glass, picture and backing therein by means of brads driven into the frame against the backing.

Each of these methods has certain objections; the latter one is unsightly, the nails interfere with dusting of the backs, the backing is so insufficiently supported as to permit the picture-card to buckle to a greater or less extent, and the task of driving the nails adds materially to the expense.

In the first-mentioned method, the work of slotting the lowermost frame-member increases the cost of production; and neither of the methods serves effectually to exclude dust from the picture.

The object of this invention is the construction of a picture frame which shall be of minimum cost to make and to mount a picture therein, and of maximum efficiency in retaining the picture and backing from buckling, and in excluding dust from the picture.

For the accomplishment of these purposes, I form all four frame-members with a groove deeper than the glass-receiving recess, and provide two backing-cards one of which is longer than the recess but slightly narrower, and the other of which is slightly shorter but wider, whereby all four edges of the picture are snugly clamped to the glass. In addition, I prefer to provide a metallic strip adapted to have its ends engaged in the side grooves over the outermost card to ensure against the latter's buckling; and by having a leg integral with this strip, to convert the frame into an easel.

In the drawings forming part of this specification, Fig. 1 is a perspective view of the rear of a picture frame embodying my improvements. Fig. 2 is a vertical section thereof. Fig. 3 is a horizontal section. Fig. 4 is an elevation of the back having parts of the frame broken away.

As shown in Figs. 2 and 3, all four of the frame-members or sides 1, 2, 3 and 4, are alike in cross section, each being recessed to provide the shoulder 5 against which rests the glass 6; and having a groove 7 into which are introduced certain edges of the backing-cards 8 and 9. As also illustrated in Fig. 4, the card 8 is slightly shorter than the space between the top and bottom members 1, 3; but wider than the space between the members 2 and 4. Consequently, after the glass 6 and the picture 10 have been introduced into the frame, the backing-card 8 is to be sprung into the grooves 7 of the vertical members 2, 4.

Following this, the backing-card 9, which is narrower than the space between the members 2, 4, but longer than the space between the members 1, 3, has its ends sprung into the top and bottom grooves 7. While this provides a most practical and efficient arrangement, serving to snugly clamp all four edges of the picture 10 against the glass 6, I prefer further to improve the same by the introduction of a metallic truss 11 about midway of the backing-card 9 to ensure against its buckling. This truss is of thin sheet metal having one edge bent out, as at 12, for stiffening it; and it is put in place by first pressing one end into a lateral groove 7, with the truss itself at an angle as shown in the dotted lines in Fig. 4, and then by swinging its other end down into the groove 7 thereat.

As a further refinement of the invention, and to permit it to become an easel, the truss 11 is provided with a leg or brace 13 preferably a continuation of the flange 12, and bent at such an angle as to suitably support the frame in a slightly inclined position, as illustrated in Fig. 1.

Additional to the advantages of my construction above set forth, it is readily seen that the truss, backing-cards and picture can at any time be readily removed for the introduction of some other picture, or for wiping off both surfaces of the glass.

It is to be understood that my invention is not limited to the use of two backing cards, as more than two may be used where the size of the grooves 7 permit; and substantially the same purpose may be accomplished with only one of either of said cards 8 and 9 although not so satisfactorily. In case only one backing-card is used only two of the frame-members need have grooves if so desired, in which case the ones having grooves would be either 1, 3 or 2, 4.

The main advantages of my construction, however, consist in the saving of time, and hence of expense, in mounting the picture and backing in the frame; and in the snugness and security from dust and buckling with which the picture is held therein.

What I claim as my invention is:

1. A picture frame comprising four sides, each having a groove, and two flexible backing-cards therefor, one being narrower than the space between the lateral frame-members but long enough to enter the grooves in the top and bottom frame-members, and the other being shorter than the space between the top and bottom frame-members but wide enough to enter the grooves of the lateral frame-members.

2. A picture frame comprising four sides, each having a groove, and two flexible backing-cards therefor, one being narrower than the space between the lateral frame-members but long enough to enter the grooves in the top and bottom frame-members, and the other being shorter than the space between the top and bottom frame-members but wide enough to enter the grooves of the lateral frame-members, and a truss adapted to be engaged with opposite grooves in the frame-members for preventing buckling of the backing-cards.

3. The combination with a picture frame having grooves in its lateral frame-members and a backing therein, of a metallic truss having a stiffening flange and a brace for the support of the frame, and adapted to have its extremities introduced into opposing grooves.

In testimony that I claim the foregoing invention, I have hereunto set my hand this first day of February, 1928.

ORRIN CHAMPLAIN, JR.